United States Patent
Azar

(10) Patent No.: US 10,242,462 B2
(45) Date of Patent: Mar. 26, 2019

(54) RATE CONTROL BIT ALLOCATION FOR VIDEO STREAMING BASED ON AN ATTENTION AREA OF A GAMER

(71) Applicant: Nvidia Corporation, Santa Clara, CA (US)

(72) Inventor: Hassane S. Azar, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 230 days.

(21) Appl. No.: 13/855,348

(22) Filed: Apr. 2, 2013

(65) Prior Publication Data

US 2014/0292751 A1 Oct. 2, 2014

(51) Int. Cl.
| | |
|---|---|
| *G06F 3/01* | (2006.01) |
| *G06T 9/00* | (2006.01) |
| *A63F 13/21* | (2014.01) |
| *H04N 19/17* | (2014.01) |
| *A63F 13/355* | (2014.01) |
| *H04N 19/124* | (2014.01) |
| *H04N 19/139* | (2014.01) |
| *H04N 19/167* | (2014.01) |

(52) U.S. Cl.
CPC .............. *G06T 9/00* (2013.01); *A63F 13/21* (2014.09); *A63F 13/355* (2014.09); *G06F 3/013* (2013.01); *H04N 19/124* (2014.11); *H04N 19/139* (2014.11); *H04N 19/167* (2014.11); *H04N 19/17* (2014.11)

(58) Field of Classification Search
CPC .................................. G06T 17/00; G06T 9/00
USPC .......................................................... 345/420
See application file for complete search history.

(56) References Cited

U.S. PATENT DOCUMENTS

| | | | |
|---|---|---|---|
| 2003/0007488 A1 | 1/2003 | Rao | |
| 2003/0122942 A1* | 7/2003 | Parker .................. | H04N 19/176 348/231.3 |
| 2004/0095999 A1 | 5/2004 | Piehl et al. | |
| 2006/0056717 A1 | 3/2006 | Cheung et al. | |
| 2007/0036227 A1 | 2/2007 | Ishtiaq | |
| 2007/0081211 A1 | 4/2007 | Tange et al. | |

(Continued)

FOREIGN PATENT DOCUMENTS

| | | |
|---|---|---|
| CN | 1781311 A | 5/2006 |
| CN | 101345870 A | 1/2009 |

(Continued)

OTHER PUBLICATIONS

Wang, Ye-Kui; Xin Fan; Li, Houqiang; Zhengkai Liu; Mingjing Li, "An attention based spatial adaptation scheme for H.264 videos on mobiles," Multi-Media Modelling Conference Proceedings, 2006 12th International , vol., No., pp. 7 pp. 0-0 0.*

(Continued)

Primary Examiner — Shivang I Patel

(57) ABSTRACT

A video encoder, a method of encoding a frame of video data, and a three-dimensional modeling system producing an encoded video stream are disclosed herein. In one embodiment, the method includes: (1) receiving from an application a frame of video data to be encoded, (2) determining a gamer's attention area for the frame of video data and (3) changing an encoding of the frame of video data by allocating bits for the frame based upon the gamer's attention area.

20 Claims, 2 Drawing Sheets

(56) References Cited

U.S. PATENT DOCUMENTS

| | | |
|---|---|---|
| 2007/0268964 A1 | 11/2007 | Zhao |
| 2009/0097543 A1 | 4/2009 | Pan et al. |
| 2010/0295847 A1 | 11/2010 | Titus |
| 2011/0276863 A1 | 11/2011 | Bhise et al. |
| 2013/0054835 A1 | 2/2013 | Sliger et al. |
| 2014/0092209 A1 | 4/2014 | Azar et al. |
| 2014/0161173 A1 | 6/2014 | Azar et al. |

FOREIGN PATENT DOCUMENTS

| | | |
|---|---|---|
| CN | 102129698 | 7/2011 |
| CN | 102238374 | 11/2011 |
| CN | 102637302 A | 8/2012 |
| JP | 2003204436 A | 7/2003 |
| JP | 2008113292 A | 5/2008 |

OTHER PUBLICATIONS

Li-Qun Chen, Xing Xie, Xin Fan, Wei-Ying Ma, Hong-Jiang Zhang, and He-Qin Zhou. A Visual Attention Model for Adapting Images on Small Displays. Multimedia Systems, 9(4):353-364, Oct. 2003.*

Rahimi, H.; Nazari Shirehjini, A.A.; Shirmohammadi, S., "Activity-centric streaming of virtual environments and games to mobile devices," Haptic Audio Visual Environments and Games (HAVE), 2011 IEEE International Workshop on , vol., No., pp. 45,50, Oct. 14-17, 2011.*

Lei et al (Wei Lai, Xiao-Dong Gu, Ren-Hua Wang, Wei-Ying Ma and Hong-Jiang Zhang, "A content-based bit allocation model for video streaming," 2004 IEEE International Conference on Multimedia and Expo (ICME) (IEEE Cat. No. 04TH8763), Taipei, 2004, pp. 1315-1318 vol. 2).*

Wandell, Brian A., "Foundations of Vision" Chapter 2: Image Formation, 28 pages, Jun. 1995, https://www.stanford.edu/group/vista/cgi-bin/FOV/chapter-2-image-formation/.

Foreign Communication From a Related Counterpart Application, German Application No. 10 2013 015 821.4 German First Examination Report dated Jan. 7, 2015, 10 pages.

Martinez, J.L.; et al, "Efficient WZ-to-H264 Transcoding Using Motion Vector Information Sharing", IEEE International Conference on Multimedia and Expo, pp. 1394 to 1397, Jun. 28, 2009 to Jul. 3, 2009.

Oh, Han, et al, "H.264—Based Depth Map Sequence Coding Using Motion Information of Corresponding Texture Video", Proceedings of the First Pacific Rim conference on Advances in Image and Video Technology (PSIVT'06), pp. 898 to 907, 2006.

Daribo, Ismael, et al., "Arbitrarily Shaped Sub—Block Motion Prediction in Texture Map Compression Using Depth Information", Picture Coding, Symposium (PCS), 2012, pp. 121 to 124, May 7 to 9, 2012.

Grewatsch, Stefan, et al., "Sharing of Motion Vectors in 3D Video Coding", International Conference on Image Processing, vol. 5, pp. 3271 to 3274, Oct. 24 to 27, 2004.

Daribo, Ismael, et al. "Motion Vector Sharing and Bitrate Allocation for 3D Video—Plus—Depth Coding", EURASIP Journal on Advances in Signal Processing, vol. 2009, Article ID 258920, 2009.

Cheung, Gene, et al., "Fast H.264 Mode Selection Using Depth Information for Distributed Game Viewing", Society Photo—Optical Instrumentation Engineers (SPIE) Conference Series, vol. 6822, 2008.

\* cited by examiner

RATE CONTROL BIT ALLOCATION FOR VIDEO STREAMING BASED ON AN ATTENTION AREA OF A GAMER

TECHNICAL FIELD

This application is directed, in general, to cloud gaming and, more specifically, to video streaming in the context of cloud gaming.

BACKGROUND

Desktop computers remain the highest performing personal computers available and are suitable for traditional businesses, individuals and gamers. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client as a video stream (often including audio). The client simply decodes the video stream and displays the content. High-end graphics hardware can thereby be obviated on the client end, which requires the ability to play video.

SUMMARY

In one aspect, the disclosure provides a method for encoding a frame of video data. In one embodiment, the method includes: (1) receiving from an application a frame of video data to be encoded, (2) determining a gamer's attention area for the frame of video data and (3) changing an encoding of the frame of video data by allocating bits for the frame based upon the gamer's attention area.

In another aspect, the disclosure provides a video encoder. In one embodiment, the video encoder includes: (1) an encoding engine configured to receive a signal representing a frame of video data and to produce encoded information related to the frame of video data and (2) a bit rate modifier coupled to the encoding engine and configured to change the encoded information by allocating bits for the frame according to a gamer's attention area for the frame.

In still yet another aspect, the disclosure provides a three-dimensional modeling system producing an encoded video stream. In one embodiment, the system includes: (1) a content engine, (2) a renderer coupled to the content engine and configured to receive from the content engine information relating to a three-dimensional model and produce corresponding two-dimensional images and (3) a video encoder coupled to the renderer and configured to receive the two-dimensional images from the renderer and produce a corresponding encoded video stream. The video encoder is further configured to alter an allocation of bits used to produce a frame of the corresponding encoded video stream based on a gamer's attention area of the frame.

BRIEF DESCRIPTION

Reference is now made to the following descriptions taken in conjunction with the accompanying drawings, in which.

DETAILED DESCRIPTION

Figure 1:
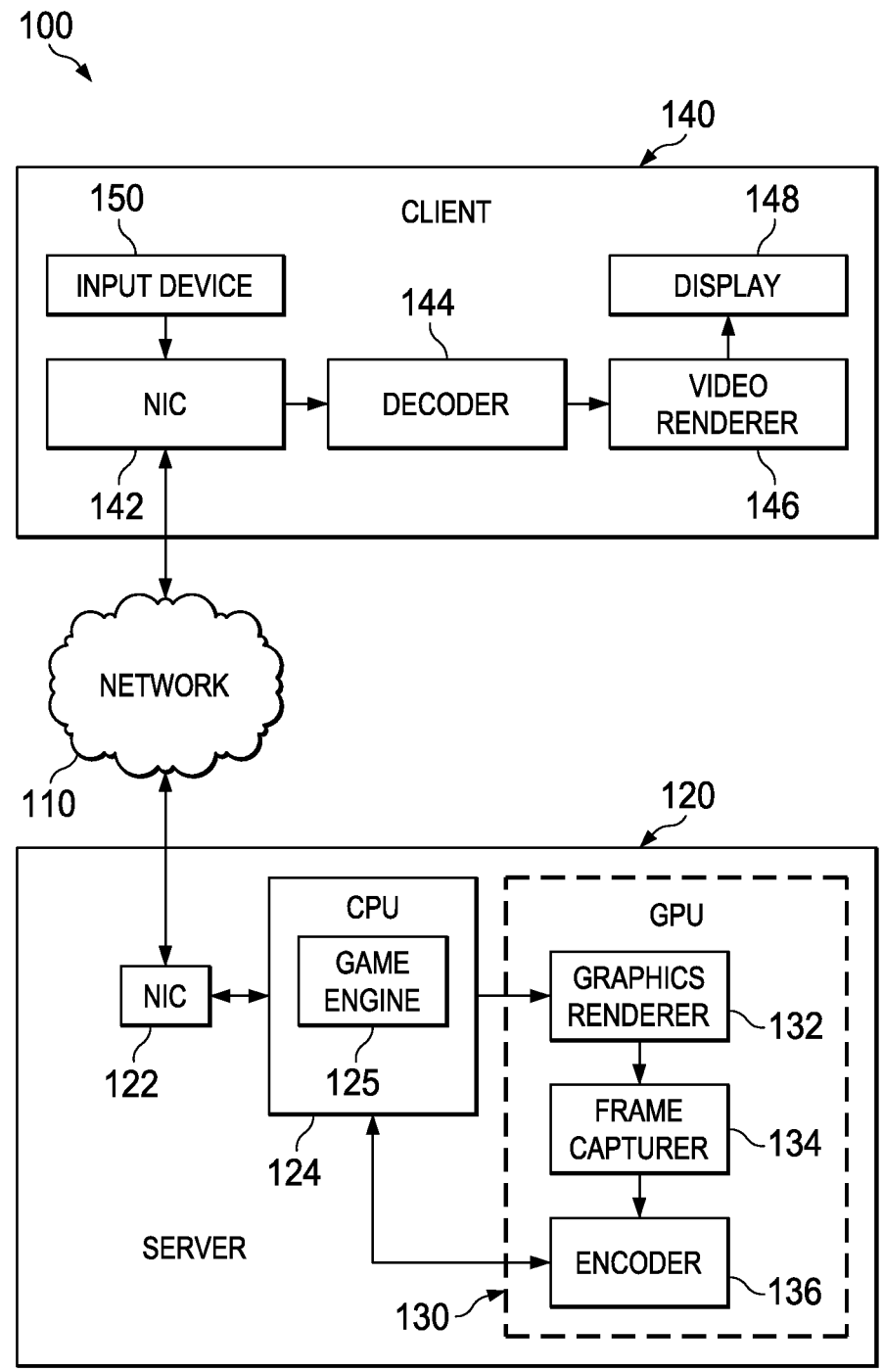
FIG. 1 illustrates a block diagram of an embodiment of a cloud gaming system.

Transmitting content over a network in a cloud architecture as a video stream can be challenging. Real-time video compression is one feature that is used to assist in transmitting the content. In very general terms, video compression, or video encoding, compares one frame to the previous and sends only the differences between frames. Such encoding works well if the video has small amounts of motion. A still frame of text, for example, can be repeated with very little transmitted data. However, if the video has with more motion, more pixels change from one frame to the next, and thus, the video compression scheme must send more data to keep up with the larger number of pixels that are changing.

Often, the most compelling video content may have extensive differences between frames (e.g., large amounts of motion, explosions, etc.). A very powerful video processing architecture is typically required to handle such intense video. Such video often has a great deal of high frequency detail and, in order to maintain frame rate, the video processor either decreases the quality of the video or increases the bit rate of the video to render this added information with the same level of detail as in previous frames.

Streaming bits over a network, however, cost money for operators and limited bandwidth in an error prone network causes higher latency. This negatively impacts a user's experience (perceived lag between input action and on screen display of rendered result) when running a game or other three-dimensional application.

Accordingly, it is realized herein that an attention area of a user, herein referred to as a gamer, may be employed in a video compression process to intelligently allocate bits when transmitting content to a client. Thus, the disclosure provides various embodiments and schemes to improve the allocation of bits by an encoder to, for example, reduce the bit rate. In one embodiment, an improved encoder is provided that allocates bits more effectively per frame, by relying on the gamer's attention area to accurately guide rate control bit allocation. As such, the disclosed encoder can be configured to at least maintain the perceived visual quality of a frame for a gamer. In some embodiments, the disclosed encoder is flexible to: (1) maintain the total number of bits in a frame while increasing a perceived visual quality of the frame by increasing the number of bits in a gamer's attention area (or areas) and decreasing the number of bits elsewhere in the frame, and/or (2) decrease the total number of bits in a frame while maintaining a perceived visual quality of the frame by keeping the number of bits the same in the gamer's attention area (or areas) and decreasing the number of bits elsewhere in the frame. The perceived visual quality of a frame, therefore, can be subjective based on a gamer's perception of the gamer's attention area. For example, bits can be allocated where it matters to a gamer to improve visual quality in an area of attention. Additionally, the number of bits can be reduced, or aggressively reduced, where it does not matter as much to a gamer; thereby reducing latency and cost. In some embodiments, the gamer's attention area can be determined from game hints, a gamer's attention model, intelligent eyewear, a head-tracking device or a combination thereof.

The gamer's attention model recognizes that at least for certain categories of games, normally referred to as First Person Shooter (FPS), empirical data indicates a gamer's attention area. For example, the eyes of a gamer tend to stay at the center of a screen 80%-90% of the time while playing. Additionally, the eyes of a gamer gravitate toward motion and occasionally check a Heads-Up-Display (HUD) or User Interface (UI) elements that are displayed.

As discussed herein, a bit rate modifier is provided that modulates the weight of bit allocation of an encoder based on the gamer's attention area. In one embodiment, the gamer's attention area is determined or at least partially determined by global motion. Global motion correlates with the movement of the camera controlled by the gamer. As with different types of game information or data, the global motion can be obtained as a hint from the game engine such as described, for example, in U.S. patent application Ser. No. 13/632,210 file on Oct. 1, 2012, and U.S. patent application Ser. No. 13/711,358 filed on Dec. 11, 2012. The global motion can be represented by a global motion vector.

In one embodiment, if global motion is zero, the disclosed encoder operates at the regular rate control bit allocation. In such case, the assumption is that the gamer is most likely scanning the entire scene to pick up any useful information before proceeding with an action. Thus, instead of altering the allocation of bits, the default rate control is used to insure the bits are allocated evenly across the frame.

With global motion or larger global motion, the gamer's eyes are most likely focused on chasing a target at the attention area. In such case, the disclosed scheme is activated and allocates more bits to the gamer's attention area. Additionally, fewer bits can be allocated elsewhere following eccentricity with logarithmic bit allocation fall-off. A two-dimensional Gaussian model or another type of mathematical model can be used to represent the gamer's attention area and control allocation of bits. For example, a shift-invariant model can be used that represents image formation of an eye. The net result is improved subjective quality and bit saving. In some instances where eye tracking is difficult to predict/correlate, the encoder can automatically fallback to the regular method of rate control bit allocation.

In some embodiments, a frame may include multiple centers of attentions for a gamer that can be used. For example, a game engine can place "markers" on targets for gamers to chase. HUD or UI elements can also be identified as centers of attention for a gamer. Game hints may be passed to the encoder indicating these multiple centers of attention.

Before describing embodiments of the encoder or method introduced herein, a cloud gaming environment within which the encoder or method may be embodied or carried out will be described.

FIG. 1 is a block diagram of an embodiment of a cloud gaming system 100 constructed according to the principles of the disclosure. Cloud gaming system 100 includes a network 110 through which a server 120 and a client 140 communicate. Server 120 represents the central repository of gaming content, processing and rendering resources. Client 140 is a consumer of that content and those resources. Server 120 is freely scalable and has the capacity to provide that content and those services to many clients simultaneously by leveraging parallel and apportioned processing and rendering resources. The scalability of server 120 is limited by the capacity of network 110 in that above some threshold of number of clients, scarcity of network bandwidth requires that service to all clients degrade on average.

Server 120 includes a network interface card (NIC) 122, a central processing unit (CPU) 124 and a GPU 130. Upon request from Client 140, graphics content is recalled from memory via an application executing on a content engine, such as game engine 125 of CPU 124. As in graphics applications, video games for instance, CPU 124, more specifically the game engine 125, reserves itself for carrying out high-level operations, such as determining position, motion and collision of objects in a given scene. From these high level operations, game engine 125 generates rendering commands that, when combined with the scene data, can be carried out by GPU 130. For example, rendering commands and data can define scene geometry, lighting, shading, texturing, motion, and camera parameters for a scene.

The game engine 125 typically produces parameters for a graphic renderer 132 that include a camera location from which the graphics renderer 132 is to generate its 2D images and a projection matrix that represents geometric mapping of the 3D model into a 2D image. In some embodiments, camera location and/or a projection matrix are included in attention area data provided to a bit rate modifier of an encoder 136. Changes from previous values to current values of camera location and/or projection matrix, combined with the Z-buffer information (image depth coordinate information) for elements of the 3D model, may indicate global motion across the image.

GPU 130 includes the graphics renderer 132, a frame capturer 134 and the encoder 136. Graphics renderer 132 executes rendering procedures according to the rendering commands generated by CPU 124, yielding a stream of frames of video for the scene. Those raw video frames are captured by frame capturer 134 and encoded by encoder 136. Encoder 136 formats the raw video stream for transmission, possibly employing a video compression algorithm such as the H.264 standard arrived at by the International Telecommunication Union Telecommunication Standardization Sector (ITU-T) or the MPEG-4 Advanced Video Coding (AVC) standard from the International Organization for Standardization/International Electrotechnical Commission (ISO/IEC). Alternatively, the video stream may be encoded into Windows Media Video® (WMV) format, VP8 format, or any other video encoding format.

CPU 124 prepares the encoded video stream for transmission, which is passed along to NIC 122. NIC 122 includes circuitry necessary for communicating over network 110 via a networking protocol such as Ethernet, Wi-Fi or Internet Protocol (IP). NIC 122 provides the physical layer and the basis for the software layer of server 120's network interface.

Client 140 receives the transmitted video stream for display. Client 140 can be a variety of personal computing devices, including: a desktop or laptop personal computer, a tablet, a smart phone or a television. Client 140 includes a NIC 142, a decoder 144, a video renderer 146, a display 148 and an input device 150. NIC 142, similar to NIC 122, includes circuitry necessary for communicating over network 110 and provides the physical layer and the basis for the software layer of client 140's network interface. The transmitted video stream is received by client 140 through NIC 142. Client 140 can employ NIC 142 to collect Quality of Service (QoS) statistics based on the received video stream, including packet loss and one-way-delay.

The video stream is then decoded by decoder 144. Decoder 144 should match encoder 136, in that each should employ the same formatting or compression scheme. For instance, if encoder 136 employs the ITU-T H.264 standard, so should decoder 144. Decoding may be carried out by either a client CPU or a client GPU, depending on the physical client device. Once decoded, all that remains in the video stream are the raw rendered frames. The rendered frames are processed by a basic video renderer 146, as is done for any other streaming media. The rendered video can then be displayed on display 148.

An aspect of cloud gaming that is distinct from basic media streaming is that gaming requires real-time interactive streaming. Not only must graphics be rendered, captured and encoded on server 120 and routed over network 110 to client 140 for decoding and display, but user inputs to client 140 must also be relayed over network 110 back server 120 and processed within the graphics application executing on CPU 124. This real-time interactive component of cloud gaming limits the capacity of cloud gaming systems to "hide" latency.

Client 140 periodically sends QoS statistics back to Server 120. When the QoS statistics are ready to be sent, Client 140 includes the frame number of the frame of video being rendered by video renderer 146. The frame number is useful for server 120 to determine how well network 110 and client 140 are handling the video stream transmitted from server 120. Server 120 can then use the QoS statistics to determine what actions in GPU 130 can be taken to improve QoS. Actions available to GPU 130 include: adjusting the resolution at which graphics renderer 132 renders, adjusting the capture frame rate at which frame capturer 134 operates and adjusting the bit rate at which encoder 136 encodes.

Figure 2:
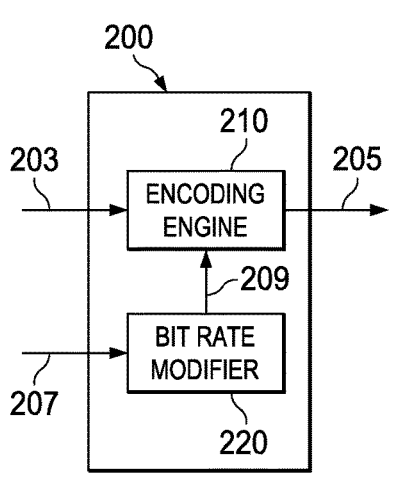
FIG. 2 illustrates a block diagram of an embodiment of video encoder constructed according to the principles of the disclosure.

In one embodiment, the encoder 136 is configured to function as a conventional encoder 136 and, in addition, adjust the bit rate by intelligently allocating bits according to the gamer's attention area. As such, the encoder 136 may cooperate with a QoS module to reduce the bit rate for transmitting the video stream and thus reduce latency, errors and costs. Advantageously, the video compression standard for the encoder 136 does not need to be changed to intelligently allocate bits as disclosed herein. The video compression standard allows changes to QP per macroblock on the encoder side, and decoders, such as decoder 144 on the client side, decode the stream as usual. FIG. 2 provides more detail of an embodiment of an encoder that allocates bit rates according to the gamer's attention area.

FIG. 2 illustrates a block diagram of an embodiment of an encoder 200 constructed according to the principles of the disclosure. A processor, including a dedicated processor, can be employed to implement the encoder 200. The encoder 200 may be employed as the encoder 136. As such, the encoder 200 can be part of a server.

The encoder 200 includes an encoding engine 210 and a bit rate controller 220. In the illustrated embodiment, the encoding engine 210 is configured to receive video frames 203 and further configured to produce from the frames 203 an encoded video stream 205. In the illustrated embodiment, the bit rate modifier 220 is configured to receive attention area data 207 related to the two-dimensional images of the video frames 203 and determine the gamer's attention area of each of the video frames 203 based on the attention area data 207. The attention area data 207 can be obtained as game hints from a game engine, such as game engine 125 of FIG. 1. Attention area data 207, or a portion thereof, can be generated from associated devices that track a gamers' center of gaze. The devices include, for example, intelligent eyewear, head-tracking systems and a combination thereof. The attention area data 207 can include image depth coordinate information (or z-depth information), a projection matrix of the current frame, a projection matrix of the previous frame and camera location. In some embodiments, a motion vector such as a global motion vector is included in the attention area data. The attention area data can also include the center of attention of the display, such as display 148.

The encoding engine 210 may begin by generating a difference frame from a 2D image received from a renderer, such as graphics renderer 132 of FIG. 1. The difference frame is typically generated by comparing the 2D image to a previous video frame. The difference frame is typically generated by breaking the 2D image into macroblocks, which are fixed-size squares or rectangular collection of adjacent pixels.

The difference frame is then transformed into a form suitable for compression; for example, by applying a Discrete Cosine Transform (DCT) or Integer Transform (IT) to the difference frame to produce transform coefficients, or simply coefficients. The coefficients are then quantized based upon a parameter typically referred to as the "quantization parameter" or "QP." Quantization restricts the original range of values of the transform coefficients to a smaller set of discrete levels. Typically, QP is applied across an entire image by dividing each of the coefficients by the value of QP.

The quantized transform coefficients are then transformed into symbols, or codewords. This transformation is typically based upon a frequency of occurrence of symbols in the sequence of frames of quantized coefficients. These frames of symbols (along with other information such as QP, frame time stamps, a sequence in which macroblocks are selected in the frame, and any other information required for decoding) form the encoded video stream 205.

A rate control function within the encoding engine 210 determines the value of QP, typically, to restrict an average bit rate of the encoded video stream 205 to a target value, while attempting to ensure adequate quality (or a specified quality) for a video frame reproduced from the encoded data.

Encoding video frames may include pre-processing such as comparing macroblocks generated while producing a difference frame to one or more previous frames to detect whether a macroblock has remained substantially unchanged, but simply moved some number of pixels in the frame. Such a determination is often made by shifting a macroblock by a small number of pixels in all directions (for example, N, NE, E, SE, S, SW, W, NW) and comparing each shifted macroblock to the previous frame. If no match is found, the macroblock may be shifted a greater distance in each direction and compared again to the previous frame.

When/if a match is finally found, a partial encoding of the frame may be produced by using the ID of the macroblock in the previous frame and the amount and direction of the shift. The values of amount and direction may be referred to as a "motion vector." A plurality of motion vectors for a corresponding plurality of macroblocks may be referred to as a "motion field." Motion vectors and motion fields may also be used to predict motion in subsequent frames. The motion vectors and/or motion fields can be used to generate a global motion vector.

The rate control function described above may also set a time or iteration limit for such motion vector searches and, if no match is found within the limit, the search is abandoned. The rate control function balances processing power applied to motion estimation and to difference calculations in order to produce a high quality video stream at a desired bit rate, or a low bit rate video stream at a desired video quality.

Some video encoding standards permit comparisons between frames to be performed only with reference to an immediately preceding or succeeding frame. Other standards permit an image to be encoded with reference to a plurality of preceding or succeeding frames. Such "multiple reference frame" encoding standards typically require greater processing power or time to encode.

The bit rate modifier 220 is coupled to the encoding engine and configured to change the encoded information by allocating bits for the frame according to a gamer's attention area for the frame. The bit rate modifier 220 is configured to determine a gamer's attention area for the frame of video data 203 to be encoded by the encoding engine 210 and change an encoding of the video data frame 203 based upon the gamer's attention area. The bit rate modifier 220 generates encoder control information 209 from the determined gamer's attention area that adjusts the rate control function of the encoding engine 210. As such, the encoding engine 210 is configured to perform encoding in accordance with the encoder control information 209 which reallocates bits for the frame 203 according to the gamer's attention area. Thus, the encoding engine 210 can be configured to perform the functions of a conventional encoding engine and the additional functionality of bit reallocation as described herein. The encoder control information 209 can be generated in acceptable format for processing by the encoding engine 210.

The bit rate modifier 220 is configured to change the rate control function of the encoding engine 210 to maintain or improve the perceived visual quality of the frame. For improving, the bit rate modifier 220 can instruct the encoding engine 210 to increase a number of bits employed to produce the encoded video stream 205 within the gamer's attention area. Additionally, the bit rate modifier 220 is configured to decrease a number of bits employed to produce the encoded information for the encoded video stream 205 outside of the gamer's attention area of the video frame 203. Thus, perceived visual quality is improved and the bit rate can be maintained. In other embodiments, the perceived visual quality can be maintained by maintaining a number of bits in a gamer's attention area and decreasing a number of bits used for encoding outside of the gamer's attention area. In some embodiments, the decreasing of bit usage can increase as the distance from the gamer's attention area increases. The bit rate modifier 220 can be configured to both maintain and increase perceived visual quality. The choice between either maintaining or increasing can be based on system quality, particular portions of a game, gamer's input, etc.

In one embodiment, the bit rate modifier 220 is configured to determine the gamer's attention area based on a mathematical model such as a two-dimensional Gaussian model. In one embodiment, the bit rate modifier 220 is further configured to alter parameters of the two-dimensional Gaussian model according to a global motion associated with the frame. A global motion vector can be used to represent the global motion. The parameters may include an amplitude, a width and a rotation of the two-dimensional Gaussian model.

Figure 4:
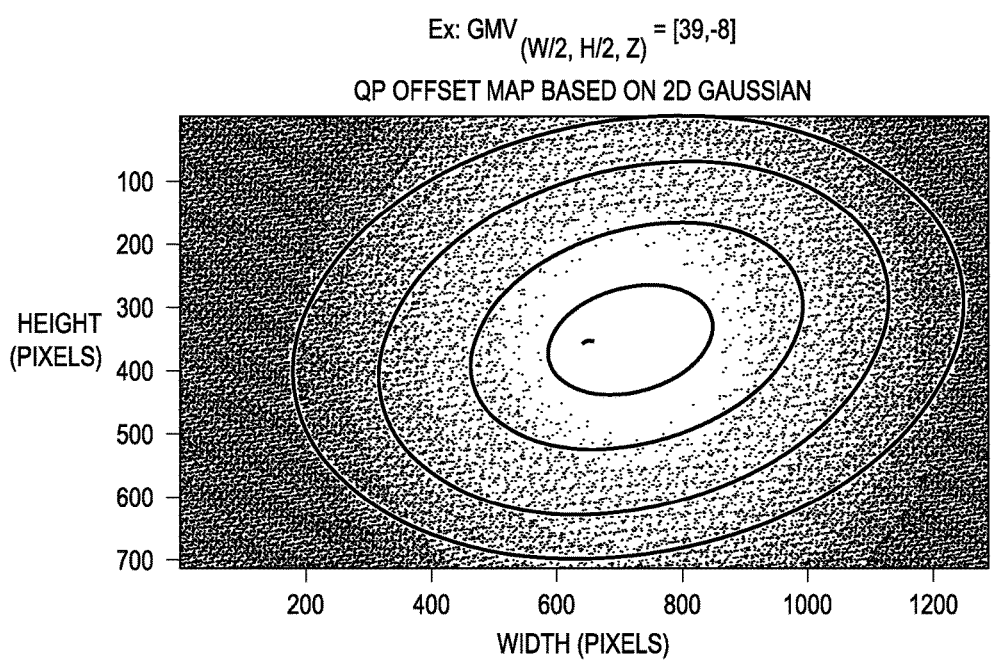
FIG. 4 illustrates an example of a QP offset map for a frame.

The bit rate modifier 220 is configured in one embodiment to adjust a QP of the video frame 203 based on a model of the gamer's attention area and a global motion vector associated with the video frame 203. The bit rate modifier 220 may compute a QP offset per macroblock of the video frame 203. FIG. 4 illustrates an example of a QP offset map.

The center ellipse of FIG. 4 represents the gamer's attention area and has the lowest QP offset. If zero, then the number of bits used for encoding this area is not changed. If the QP offset is set below zero, then the number of bits used for encoding the gamer's attention area is increased. The concentric ellipses of FIG. 4 represent the degradation of the frame moving away from the gamer's attention area to the periphery based on a 2D Gaussian model. At the periphery of a frame, the QP offset is higher and the quality is lower. In some embodiments, the QP offset steps from zero to fifty. In FIG. 4, the global motion vector (GMV) has x, y, coordinates 39, −8. The center of the image is indicated by the x, y, z coordinates W/2, H/2 and Z.

The global motion vector can be computed by the bit rate modifier 220 based on the attention area data 207. In another embodiment, the global motion vector can be determined via pre-processing of the video frame 203 by, for example, the encoding engine 210. As such, the pre-processing for the global motion vector can be performed by a GPU itself without reliance on game hints. In one embodiment, the encoding engine 210, or the encoder 124, can obtain the global motion vector by estimating frame motion, filtering local motion and then obtaining global motion.

Figure 3:
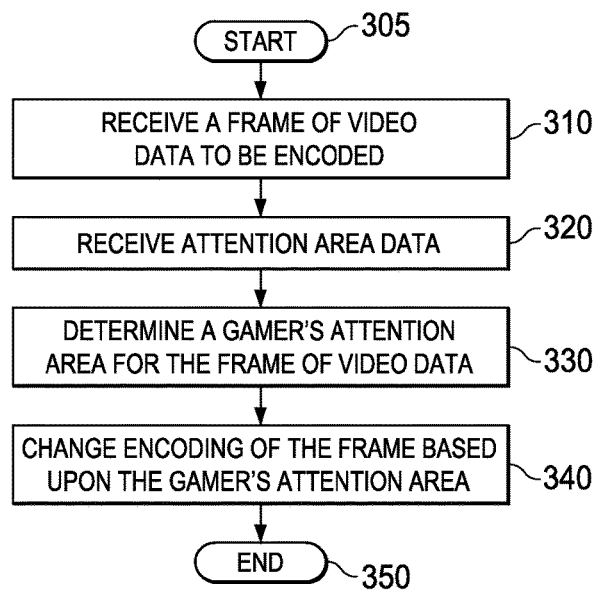
FIG. 3 illustrates a flow diagram of an embodiment of a method of encoding a frame of a video stream carried out according to the principles of the disclosure.

FIG. 3 illustrates a flow diagram of an embodiment of a method 300 of encoding a frame of a video stream carried out according to the principles of the disclosure. An encoder, such as the encoder 136 of FIG. 1 or the encoder 200 of FIG. 2 may be configured with the necessary hardware, software or combination thereof to perform the method 300. The method 300 begins in a step 305.

In a step 310, a frame of video data to be encoded is received. In one embodiment, the frame is received from an application such as a video game.

Attention area data is received in step 320. The attention area data can be received from a game engine. In one embodiment, the attention area data is received as game hints. In another embodiment, the attention area data is generated by a pre-processing routine associated with the video frame. The pre-processing routine can be performed by an encoder or another processor of a GPU.

In other embodiments, a device can be used to track eye movement of a gamer to provide the attention area data. Intelligent eyewear such as smart glasses or another head-mounted device can be used to accurately track eye movement and generate attention area data. The eyewear or device can be employed with a tracking system, such as an infrared head tracker, to accurately track eye movement.

In a step 330, a gamer's attention area for the frame of video data is determined. The gamer's attention area can be determined based on the attention area data. In one embodiment, the gamer's attention area is defined according to a human's visual angle around a center of gaze. This can typically be between two to five degrees. A global motion vector can be calculated from the generated data relative to the previous center of gaze. In some embodiments, the gamer's attention area can be derived directly from the data generated by intelligent eyewear, a device, a head tracker or a combination thereof.

A mathematical model can be employed to determine a gamer's attention area. In one embodiment, a two-dimensional Gaussian model can be used to represent each one of the gamer's attention areas. As with a human's visual angle, the two-dimensional Gaussian model also provides logarithmic resolution fall-off with eccentricity around the gamer's attention area which corresponds to the visual angle of a human. FIG. 4 illustrates an example of the logarithmic resolution fall-off with eccentricity around the gamer's attention area.

In one embodiment, a single frame can have multiple gamer's attention areas. At least one of the gamer's attention areas can be modified based on global movement. A global motion vector can be used for modifying the gamer's attention area.

In a step 340, encoding of the frame of video data is changed by allocating bits for the frame based upon the gamer's attention area. In one embodiment, the number of bits used to encode the gamer's attention area, or areas, is increased. Additionally, the number of bits used to encode the remaining portion of the frame is decreased. In other embodiments, the number of bits used to encode the gamer's attention area(s) is maintained and the number of bits used to encode the remaining portion of the frame is decreased. As such, the total number of bits for encoding a frame can be reduced. The method 300 ends in a step 350.

A portion of the above-described apparatuses, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions of the apparatuses described herein. As discussed with respect to disclosed embodiments, a bit rate controller can include the necessary hardware, software or a combination thereof that is configured to perform the described functions.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method for encoding a frame of video data, the method comprising:
   receiving from an application a frame of video data to be encoded;
   determining a user's attention area for the frame of video data; and
   with reference to Quality of Service (QoS) statistics from a client, selecting a bit rate at which the frame is encoded; and
   changing a number of bits allocated for encoding a portion of the frame of video data based on a distance of the portion from a center of the user's attention area, wherein the determining and the changing are performed by a processor in a server.

2. The method as recited in claim 1 wherein the number of bits allocated for encoding the portion decreases logarithmically as the distance of the portion from the center of the user's attention area increases.

3. The method as recited in claim 1 wherein the determining includes modeling the user's attention area according to a two-dimensional Gaussian model.

4. The method as recited in claim 3 further comprising modifying the two-dimensional Gaussian model based on a global motion vector associated with the frame.

5. The method as recited in claim 1 further comprising receiving attention area data related to a content of the frame of video data, wherein the determining is based on the attention area data.

6. The method as recited in claim 5 wherein the attention area data is obtained as hints from the application.

7. The method as recited in claim 5 wherein the attention area data is obtained from pre-processing of the frame.

8. A video encoder, comprising:
   a processor configured to receive a signal representing a frame of video data and to produce encoded information related to the frame of video data, wherein the processor is further configured to select a bit rate at which the frame is encoded with reference to Quality of Service (QoS) statistics from a client and change the encoded information by changing a number of bits allocated for encoding a portion of the frame based on a distance of the portion from a center of a user's attention area when a global motion vector associated with the frame is larger than a threshold.

9. The video encoder as recited in claim 8 wherein the processor is configured to determine the user's attention area based on a two-dimensional Gaussian model.

10. The video encoder as recited in claim 9 wherein the processor is further configured to alter an amplitude, a width and a rotation of the two-dimensional Gaussian model according to a global motion vector associated with the frame.

11. The video encoder as recited in claim 8 wherein the processor is configured to compute a global motion vector associated with the frame based on a projection matrix of the frame, a projection matrix of a previous frame and a center of attention in the middle of the frame.

12. The video encoder as recited in claim 8 where the processor is configured to increase a number of bits employed to produce the encoded information within the user's attention area.

13. The video encoder as recited in claim 12 wherein the processor is configured to decrease a number of bits employed to produce the encoded information outside of the user's attention area.

14. The video encoder as recited in claim 8 wherein the frame includes multiple user's attention areas and the processor is configured to change the encoded information of the portion of the frame based on the multiple user's attention areas.

15. A three-dimensional modeling system producing an encoded video stream, the system comprising:
a processor configured to:
receive information relating to a three-dimensional model and produce corresponding two-dimensional images;
produce a corresponding encoded video stream based on the two-dimensional images; and
with reference to Quality of Service (QoS) statistics from a client, select a bit rate at which a frame of the corresponding encoded video stream is encoded; and
change a number of bits allocated for encoding of a portion of the frame based on a distance of the portion from a center of a user's attention area of the frame.

16. The three-dimensional modeling system as recited in claim 15 wherein the user's attention area is based on a visual angle of a human around a center of gaze.

17. The three-dimensional modeling system as recited in claim 15 wherein the processor is configured to adjust a quantization parameter per macroblock of the frame based on a model of the user's attention area and a global motion vector associated with the frame.

18. The three-dimensional modeling system as recited in claim 15 wherein the processor is configured to receive user's attention data from another processor executing a game application and employ the user's attention data to determine the user's attention area.

19. The three-dimensional modeling system as recited in claim 15 wherein the processor is configured to increase a number of bits used to encode the user's attention area of the frame and reduce a number of bits used to encode a remaining portion of the frame.

20. The three-dimensional modeling system as recited in claim 15 wherein the processor is configured to maintain a number of bits used to encode the user's attention area of the frame and reduce a number of bits used to encode a remaining portion of the frame.

\* \* \* \* \*